(12) United States Patent
Love

(10) Patent No.: US 9,061,611 B2
(45) Date of Patent: Jun. 23, 2015

(54) IMPACT DISPERSAL SYSTEM FOR A CHILD SAFETY SEAT

(71) Applicant: Phillip W. Love, Smithville, TN (US)

(72) Inventor: Phillip W. Love, Smithville, TN (US)

( * ) Notice: Subject to any disclaimer, the term of this patent is extended or adjusted under 35 U.S.C. 154(b) by 0 days.

(21) Appl. No.: 14/205,546

(22) Filed: Mar. 12, 2014

(65) Prior Publication Data

US 2014/0265472 A1 Sep. 18, 2014

Related U.S. Application Data

(60) Provisional application No. 61/783,977, filed on Mar. 14, 2013.

(51) Int. Cl.
*B60N 2/28* (2006.01)
*B60N 2/42* (2006.01)
*B60N 2/427* (2006.01)

(52) U.S. Cl.
CPC ............ *B60N 2/2887* (2013.01); *B60N 2/2884* (2013.01); *B60N 2/2809* (2013.01)

(58) Field of Classification Search
CPC ... B60N 2/2809; B60N 2/2884; B60N 2/2887
USPC .......... 297/216.11, 254, 256, 256.16
See application file for complete search history.

(56) References Cited

U.S. PATENT DOCUMENTS

| | | | | |
|---|---|---|---|---|
| 3,632,165 A | * | 1/1972 | Miller | 297/254 |
| 4,215,900 A | | 8/1980 | Coult | |
| 5,524,965 A | * | 6/1996 | Barley | 297/256.16 |
| 6,017,087 A | * | 1/2000 | Anthony et al. | 297/256.16 |
| 6,375,260 B1 | * | 4/2002 | Hiramatsu et al. | 297/256.16 |
| 6,505,887 B2 | * | 1/2003 | Hampton | 297/256.16 |
| 7,086,695 B2 | * | 8/2006 | Hosoya | 297/256.16 |
| 7,252,343 B1 | * | 8/2007 | Pence | 297/254 |
| 7,753,442 B2 | | 7/2010 | Liberkowski | |
| 7,887,129 B2 | * | 2/2011 | Hei et al. | 297/256.16 |
| 8,256,840 B2 | * | 9/2012 | Dasent et al. | 297/256.16 |
| 8,444,222 B2 | * | 5/2013 | Buckingham et al. | 297/256.16 |
| 8,616,632 B2 | * | 12/2013 | Cheng | 297/216.11 |
| 8,632,124 B2 | * | 1/2014 | Clement et al. | 297/216.11 |
| 8,662,582 B2 | * | 3/2014 | Hall et al. | 297/216.11 |
| 8,833,854 B2 | * | 9/2014 | Lu et al. | 297/256.16 |

(Continued)

FOREIGN PATENT DOCUMENTS

DE 4446595 10/1995

OTHER PUBLICATIONS

International Search Report and Written Opinion for PCT application PCT/US2014/024031, ISR Mail Date Oct. 10, 2014.

*Primary Examiner* — Rodney B White
(74) *Attorney, Agent, or Firm* — Knox Patents; Thomas A. Kulaga

(57) ABSTRACT

Apparatus for securing a child safety seat and for impact dispersal. A tether system secures the child safety seat to the LATCH anchors in a vehicle. The tether tightening system attached to a frame tightens the tethers after they are snugged to the vehicle, thereby ensuring the safety seat is secured. In one embodiment, a screw-type adjustment allows for fully tightening the tethers after they are snugged up with a locking device. The child safety seat is attached to the frame with a hydraulic impact dispersal system connected to a platform that pivots. The force of an impact applies a rotational force to the platform. The energy from the impact is dispersed by the application of the platform's rotational force to a hydraulic cylinder that has a fluid connection to a dispersal valve.

20 Claims, 7 Drawing Sheets

(56) References Cited

U.S. PATENT DOCUMENTS

| | | | |
|---|---|---|---|
| 8,967,715 B2* | 3/2015 | Carpenter et al. | 297/253 |
| 2002/0043830 A1* | 4/2002 | Sawamoto | 297/216.11 |
| 2003/0047972 A1* | 3/2003 | Burleigh et al. | 297/216.11 |
| 2004/0051356 A1* | 3/2004 | Neelis | 297/216.11 |
| 2004/0095004 A1* | 5/2004 | Horton et al. | 297/216.11 |
| 2006/0163923 A1* | 7/2006 | Baumann et al. | 297/254 |
| 2007/0216203 A1* | 9/2007 | Rajasingham | 297/216.11 |
| 2008/0136223 A1* | 6/2008 | Murphy et al. | 297/216.11 |
| 2009/0120748 A1 | 5/2009 | Love | |
| 2011/0193394 A1 | 8/2011 | Stiyer et al. | |
| 2011/0227376 A1 | 9/2011 | Franck et al. | |
| 2012/0267927 A1* | 10/2012 | Rattenbury et al. | 297/256.16 |
| 2012/0319442 A1* | 12/2012 | Clement | 297/216.11 |

\* cited by examiner

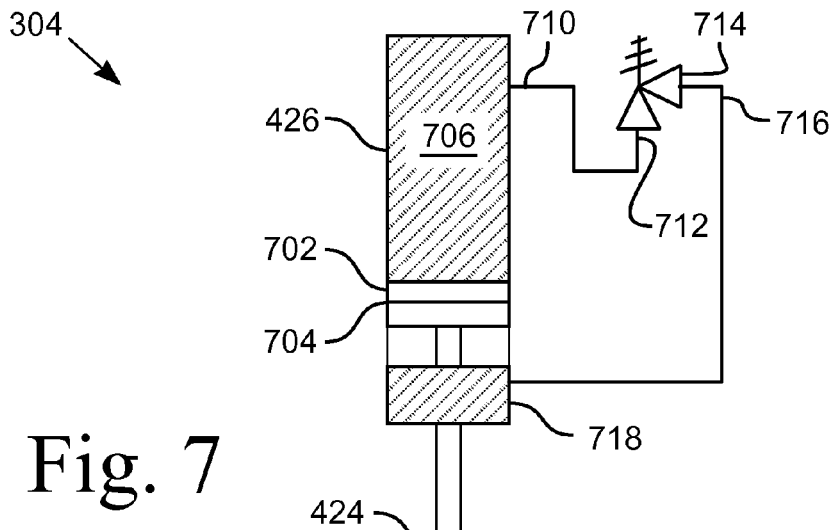
Fig. 7
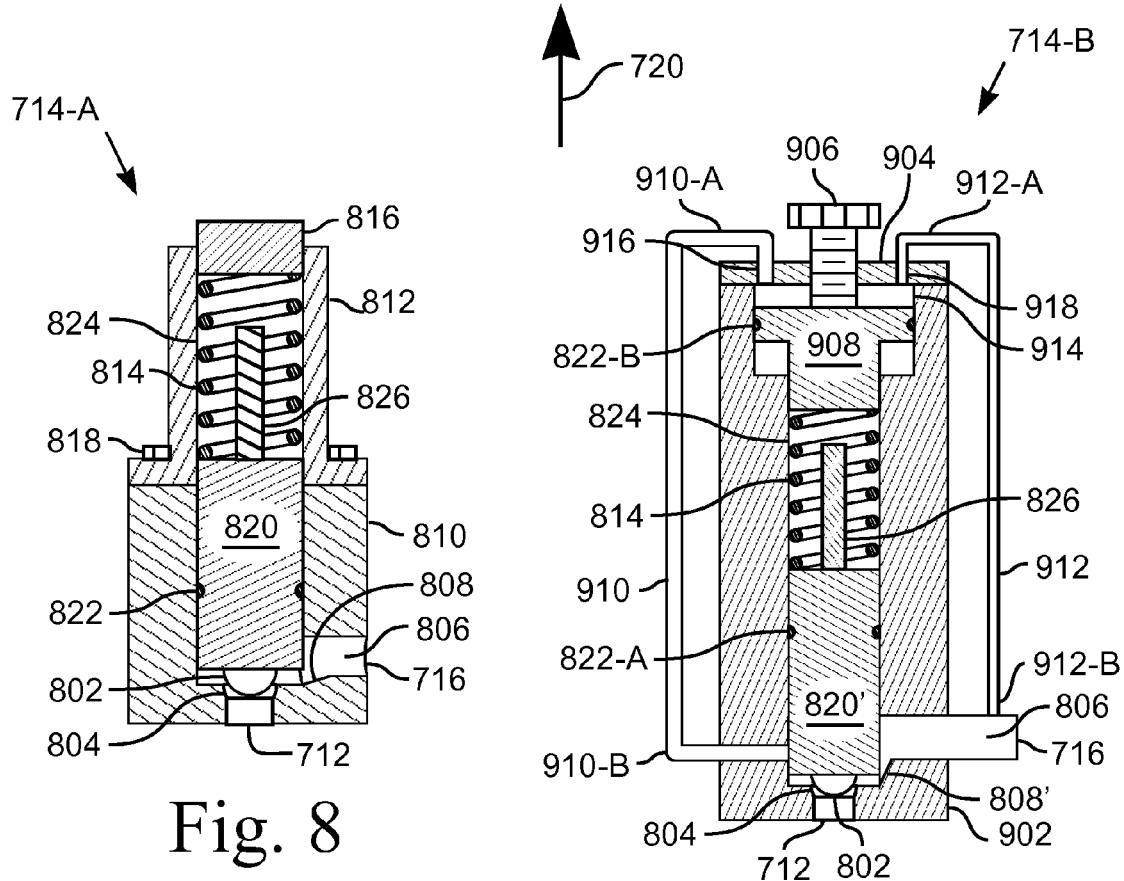
Fig. 8
Fig. 9

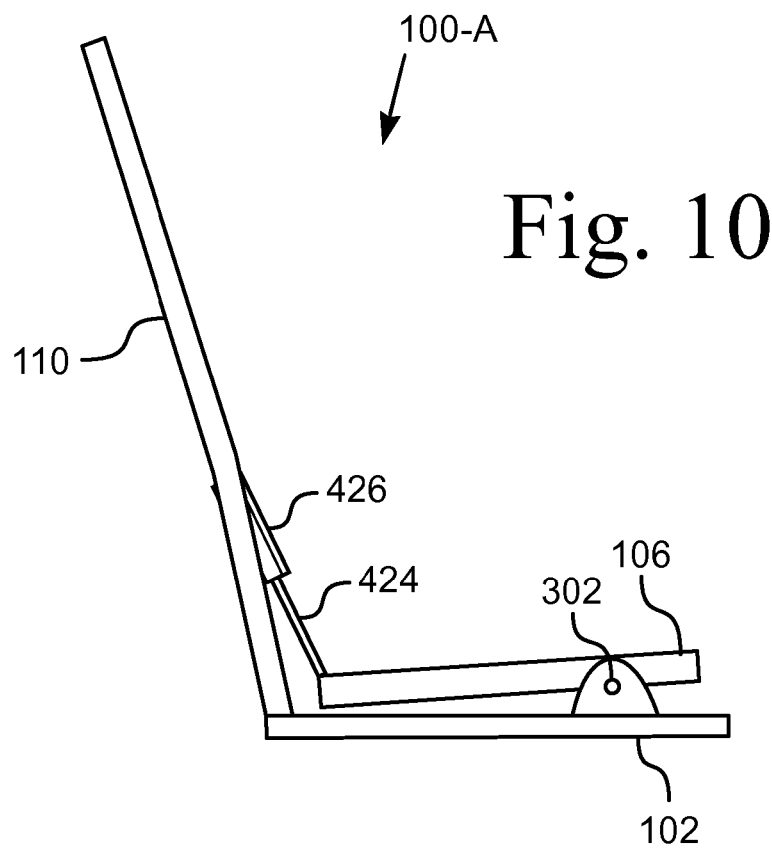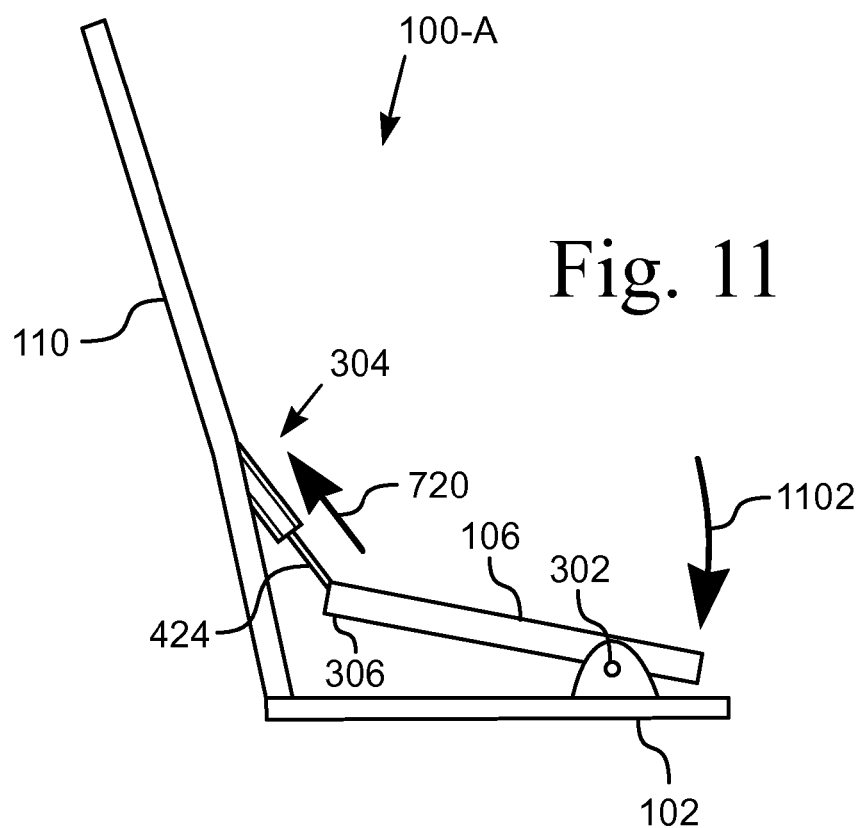

IMPACT DISPERSAL SYSTEM FOR A CHILD SAFETY SEAT

CROSS-REFERENCE TO RELATED APPLICATIONS

This application claims the benefit of U.S. Provisional Application No. 61/783,977, filed Mar. 14, 2013.

STATEMENT REGARDING FEDERALLY SPONSORED RESEARCH OR DEVELOPMENT

Not Applicable

BACKGROUND

1. Field of Invention

This invention pertains to an impact dispersal device for a child safety seat with a secure attachment mechanism. More particularly, this invention pertains to a device with an impact dispersal system that attaches to a vehicle seat through a tether system that uses mechanical advantage to tighten the tethers.

2. Description of the Related Art

In the United States automobile accidents account for the largest number of accidental deaths of infants and children. The proper use of child safety seats has reduced the number of child fatalities, but has not eliminated them. Child deaths and injuries still occur because the child safety seat is not installed and used properly or because the seat itself was not adequate to protect the child during the accident. Studies show that 70 percent of children are improperly restrained.

To aid parents and caregivers, the United States mandated the LATCH system in 2002 for automobiles. LATCH is an acronym for Lower Anchors and Tethers for CHildren. The LATCH system provides a way to secure child safety seats in automobiles without using the vehicle's seat belts. Although LATCH makes it easier for parents to install child safety seats, those seats must still be securely attached to the LATCH anchors and the tethers must be tightened properly.

In Europe, child restraint systems have been mandated since 2006. The European ISOfix standards are similar to those in the United States, although they differ in the anchorage points. The Universal ISOfix is most similar to the U.S. LATCH system, while the Semi-Universal ISOfix has a different configuration than the LATCH top tether.

Also, child safety seats are passive devices that work by restraining the child. That is, during a vehicle collision, the child safety seat restrains the child to the seat. Further, the multipoint harness of the child safety seat serves to keep the child's torso in the child safety seat. With the child rear facing, the child's head is also restrained from moving forward by the child safety seat during a front impact. However, such protection for the child's head is not available for a rear impact. This is important because a child's head is proportionally larger than an adults and has less supporting structure and strength, which results in a greater risk of harm and trauma to the child during an impact.

BRIEF SUMMARY

According to various embodiments of the present invention, an attachment system for attaching a child safety seat to a vehicle and an impact dispersal system are provided. The attachment system is a safety frame that supports a child safety seat and attaches to the vehicle. In one embodiment the safety frame is a separate assembly that attaches to the vehicle seat while accepting a separate child safety seat. In another embodiment, the safety frame is integral with the child safety seat.

The safety frame includes an impact dispersal system for a child safety seat. Child safety seats restrain a child, but do not absorb nor disperse any of the crash energy. The safety frame includes a support frame with a pivoting platform that receives a standard child safety seat. The pivoting platform is attached to the frame with an impact dispersal system that includes a hydraulic cylinder, a variable dispersion valve, and a reservoir. During a vehicle impact, the impact dispersal system is activated as the collision forces the platform to pivot. In this way, the energy of the impact is dispersed and the child is not exposed to the high g-forces that are present without the safety frame. The vertical support is proximate an upper or top anchor and the rear of the platform is proximate to a pair of lower anchor. The cylinder and piston rod are connected between the upper and lower anchors.

In the operating position, the piston rod is extended and the platform is in a normal position. Upon a front impact, the platform pivots, causing the piston rod to be pushed into the cylinder. With a sufficiently forceful impact, the pressure from the cylinder actuates the dispersion valve and the impact felt by the occupant of the child safety seat is reduced.

The safety frame also includes a tether system for attaching the safety frame to the vehicle. The safety frame includes a base and a vertical support. The vertical support includes a pair of guides for routing the vehicle seat belt through the vertical support to anchor the safety frame to the vehicle seat. Additionally, the safety frame includes tethers with the fasteners that attach to standard LATCH anchor points in the vehicle. The tether system includes a top back tether and a pair of rear tethers. The top back tether is a rear or top tether that attaches to the rear or top anchor centered behind the child safety seat. The pair of rear tethers are lower tethers that attach to the lower anchors behind the child safety seat.

In one such embodiment, the safety frame includes a tether tightening system that offers a mechanical advantage for tightening the tethers. The top tether attaches to a top anchor in the vehicle and the opposite end is attached to a top tether tightening assembly. The top tether tightening assembly includes a threaded rod and an operator that rotates the threaded rod to selectively loosen and tighten the top tether. The pair of lower tethers attach to lower anchors in the vehicle and their opposite ends engage lower tether tightening mechanisms. The lower tether tightening mechanisms include a locking cam on a movable shuttle. A threaded rod with an operator moves the shuttle to selectively loosen and tighten the lower tethers.

BRIEF DESCRIPTION OF THE SEVERAL VIEWS OF THE DRAWINGS

The above-mentioned features will become more clearly understood from the following detailed description read together with the drawings in which:

FIG. 7 is a schematic diagram of one embodiment of a hydraulic system for a safety frame system.

FIG. 8 is a cross-sectional view of one embodiment of a variable dispersion valve.

FIG. 9 is a cross-sectional view of another embodiment of a variable dispersion valve.

FIG. 10 is a pictorial view of another embodiment of the safety frame in a normal, deployed condition.

FIG. 11 is a pictorial view of the embodiment of the safety frame in an actuated condition after an impact.

DETAILED DESCRIPTION

Apparatus for attaching a child safety seat to a vehicle is disclosed. The safety frame 100 includes two features: impact dispersal to protect the occupant of a child safety seat 118 and a tethering system compatible with the LATCH system in vehicles. The impact dispersal feature disperses the energy from an impact or collision. An impact is a high force or shock that is applied over a short time period, such as caused by an object striking another at a high velocity. As used herein, the term "vehicle" is used in its broad, common meaning of a means of carrying or transporting something. For example, automobiles and sport utility vehicles (SUVs) are vehicles. The child safety seat is generally indicated as 118, with particular variations shown in the figures and described below having an alphabetic suffix, for example, 118-R, 118-F, for the rear and forward facing configurations. A similar numbering scheme is used in reference to various embodiments.

Figure 1:
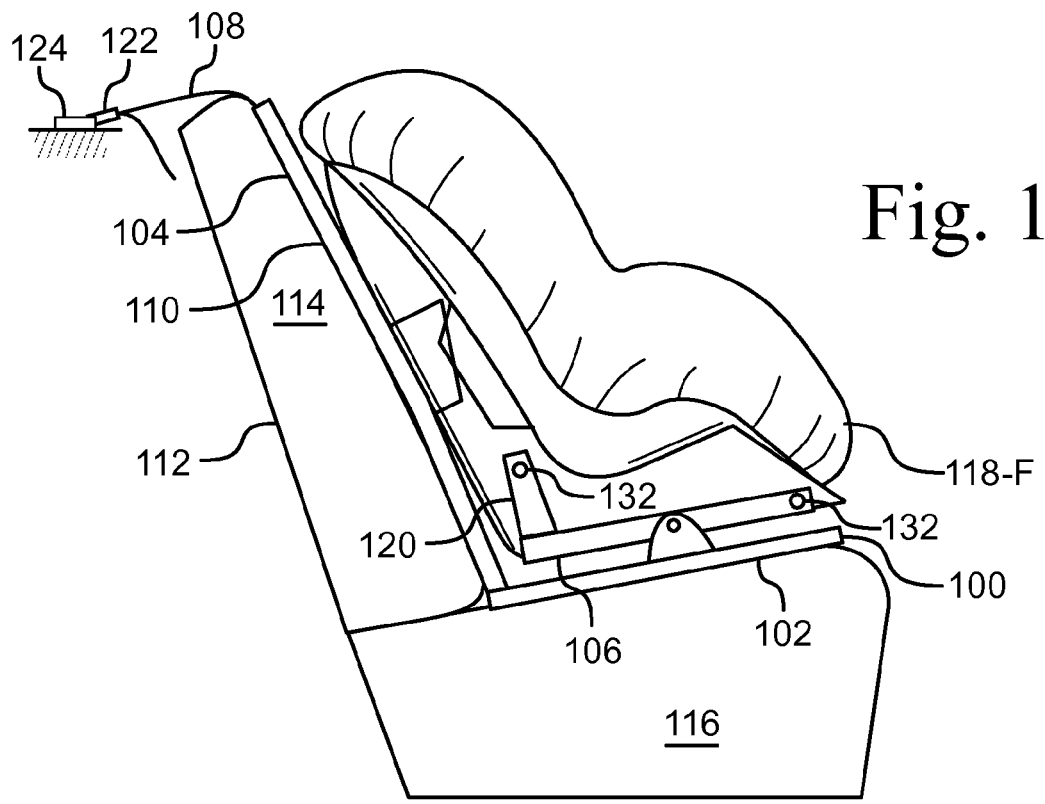
FIG. 1 is a side view of a safety frame supporting a front facing child safety seat.

FIG. 1 illustrates a side view of a safety frame 100 supporting a front facing child safety seat 118-F. The safety frame 100 is positioned on the seat base and against the backrest 112 of a vehicle seat 116. A top back, or rear, tether 108 has a connector 122 that attaches to a rear or top LATCH anchor 124 that is fixed to the vehicle.

The safety frame 100 includes a support frame 110 and a platform 106 that pivots. The support frame 110 includes a base 102 and a vertical or back support 104. The base 102 rests on the seat base 116 and the vertical support 104 rests against the backrest 112 of the vehicle seat 112. In the illustrated embodiment, the support frame 110 is secured to the vehicle by the top tether 108 attached to a top anchor 124 in the vehicle. The support frame 132 is also secured to the vehicle by lower tethers 412 attached to lower anchors (not illustrated) that are fixed to the vehicle.

The platform 106 is attached to the safety frame 100. In the illustrated embodiment, the forward facing child safety seat 118-F is supported by the platform 106. The platform 106 includes uprights 120 that have a pair of fasteners 132 securing each side of the child safety seat 118-F to the platform 106. On each side of the child safety seat 118-F is a fastener 132 at the front of the platform 106 and another fastener 132 at the rear end 306 of the platform 106.

Figure 2:
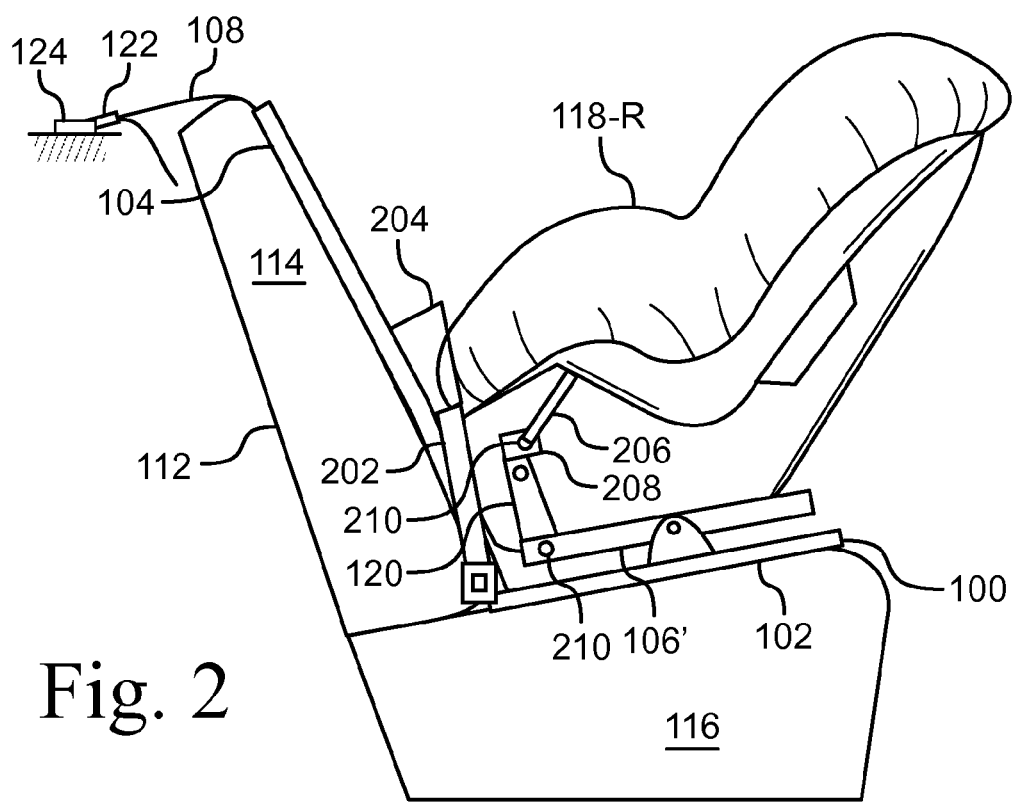
FIG. 2 is a side view of a safety frame supporting a rear facing child safety seat.

FIG. 2 illustrates a side view of a safety frame 100 supporting a rear facing child safety seat 118-R. In the illustrated embodiment, the support frame 110 is secured to the vehicle by the top tether 108 attached to a rear or top LATCH anchor 124 in the vehicle. The support frame 132 is also secured to the vehicle by threading the seat belt 202 through the side openings 204 on the vertical support 104.

The rear facing child safety seat 118-R is secured to the platform with the lower LATCH tethers 206 of the safety seat 118-R. The lower LATCH tethers 206 are secured to anchors on the uprights 120. The uprights 120 have anchor holes 210 sized to receive the hooks of the lower LATCH tethers 206. In the illustrated embodiment, the seat's tether 206 is attached at the upper anchor 210.

Figure 3:
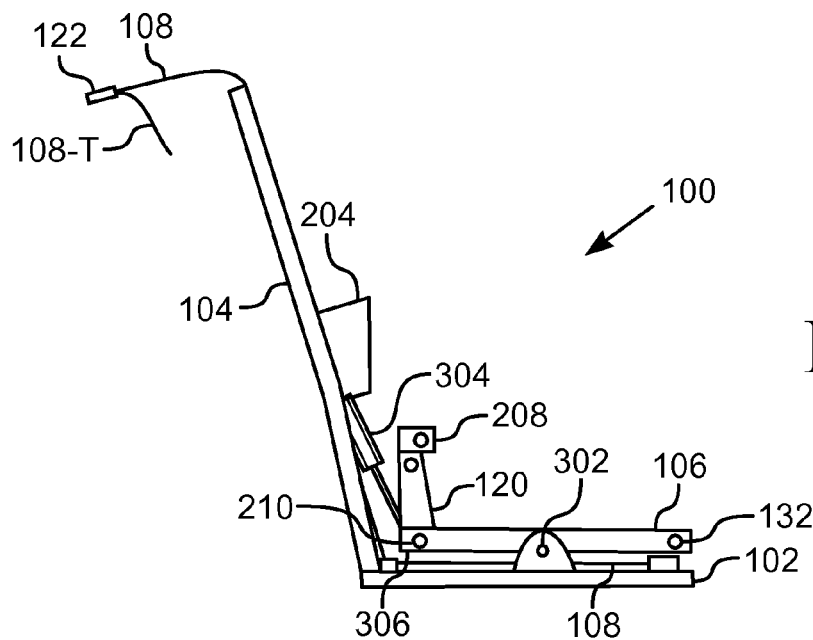
FIG. 3 is a side view of one embodiment of a safety frame.
Figure 4:
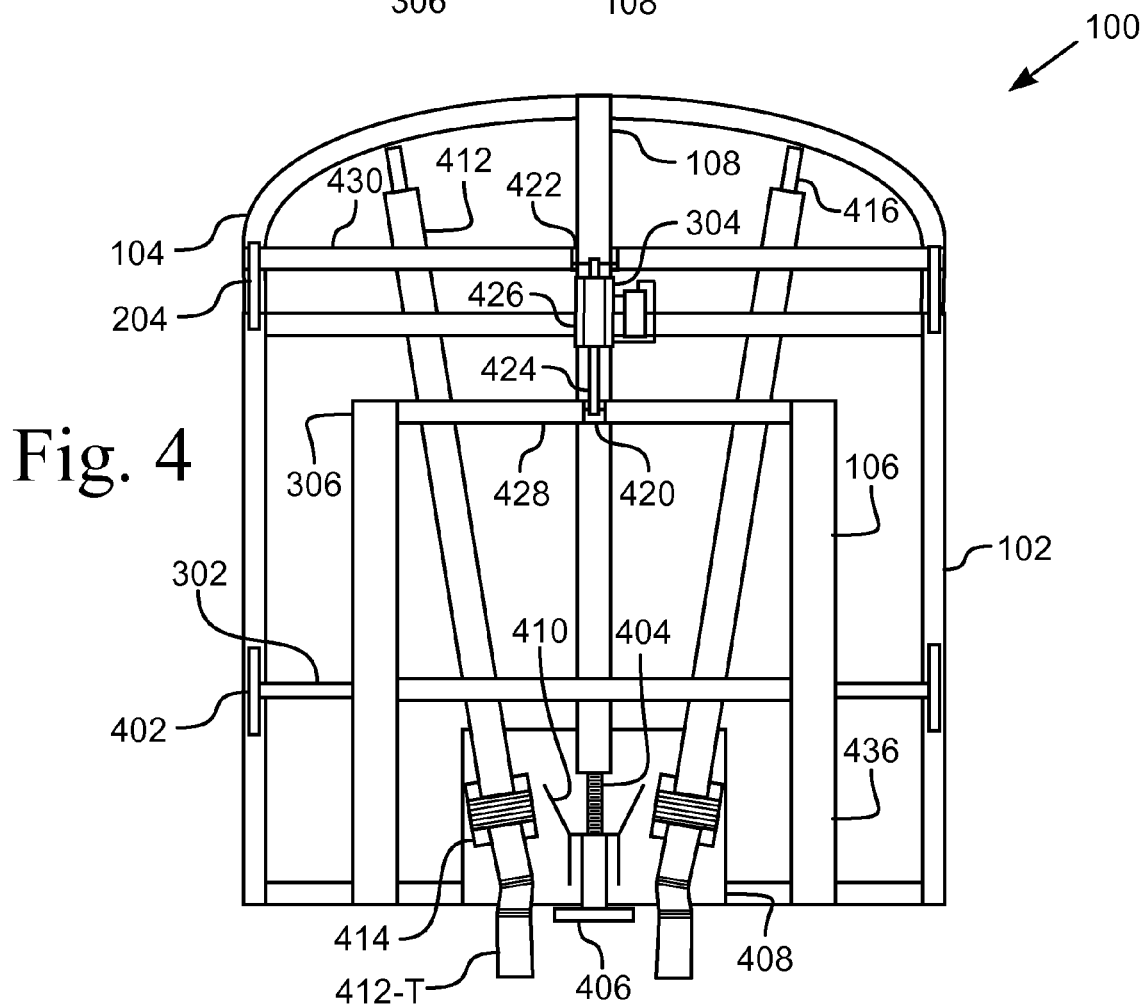
FIG. 4 is a top view of the safety frame shown in FIG. 3.
Figure 5:
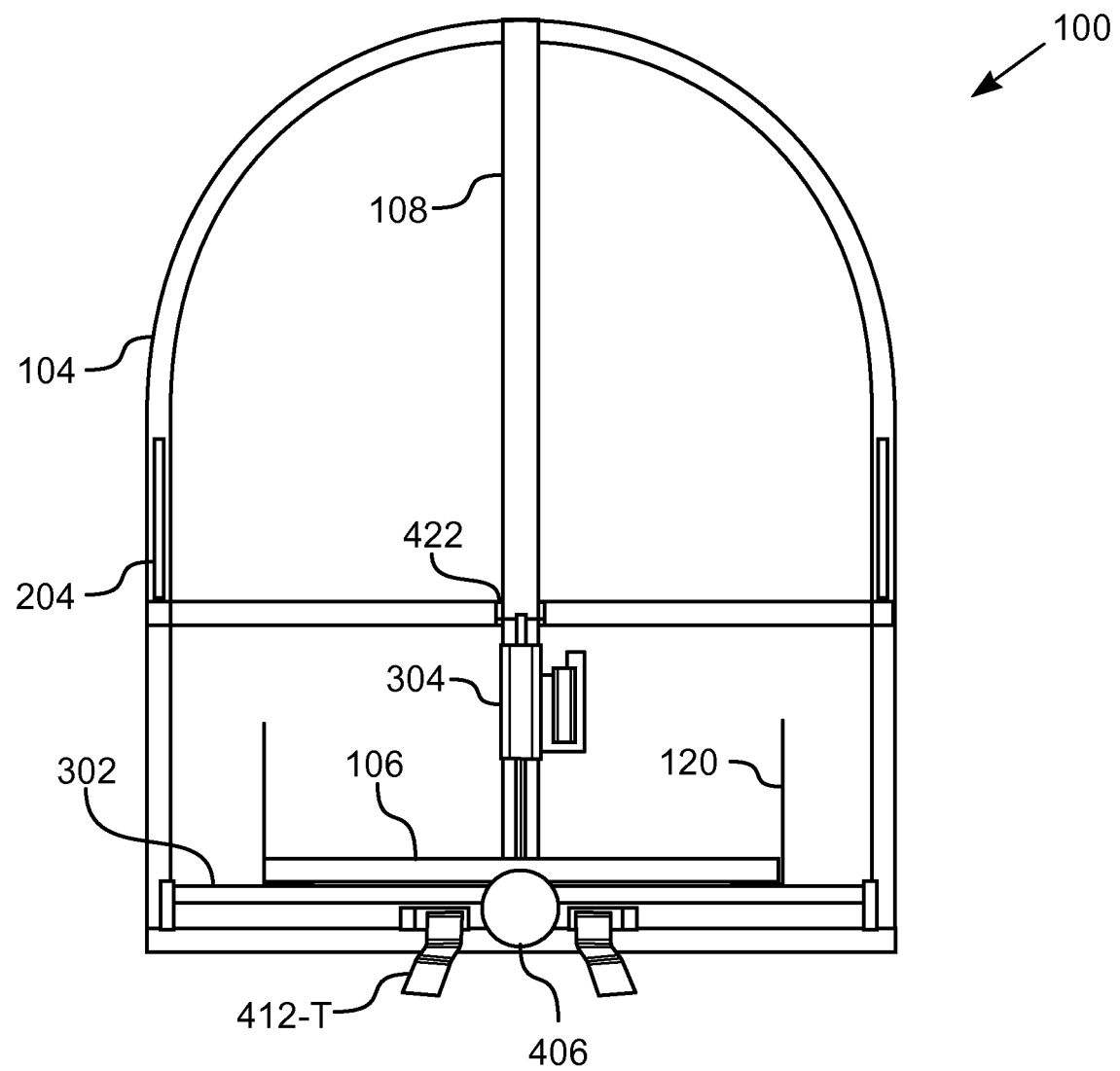
FIG. 5 is a front view of the safety frame shown in FIG. 3.
Figure 6:
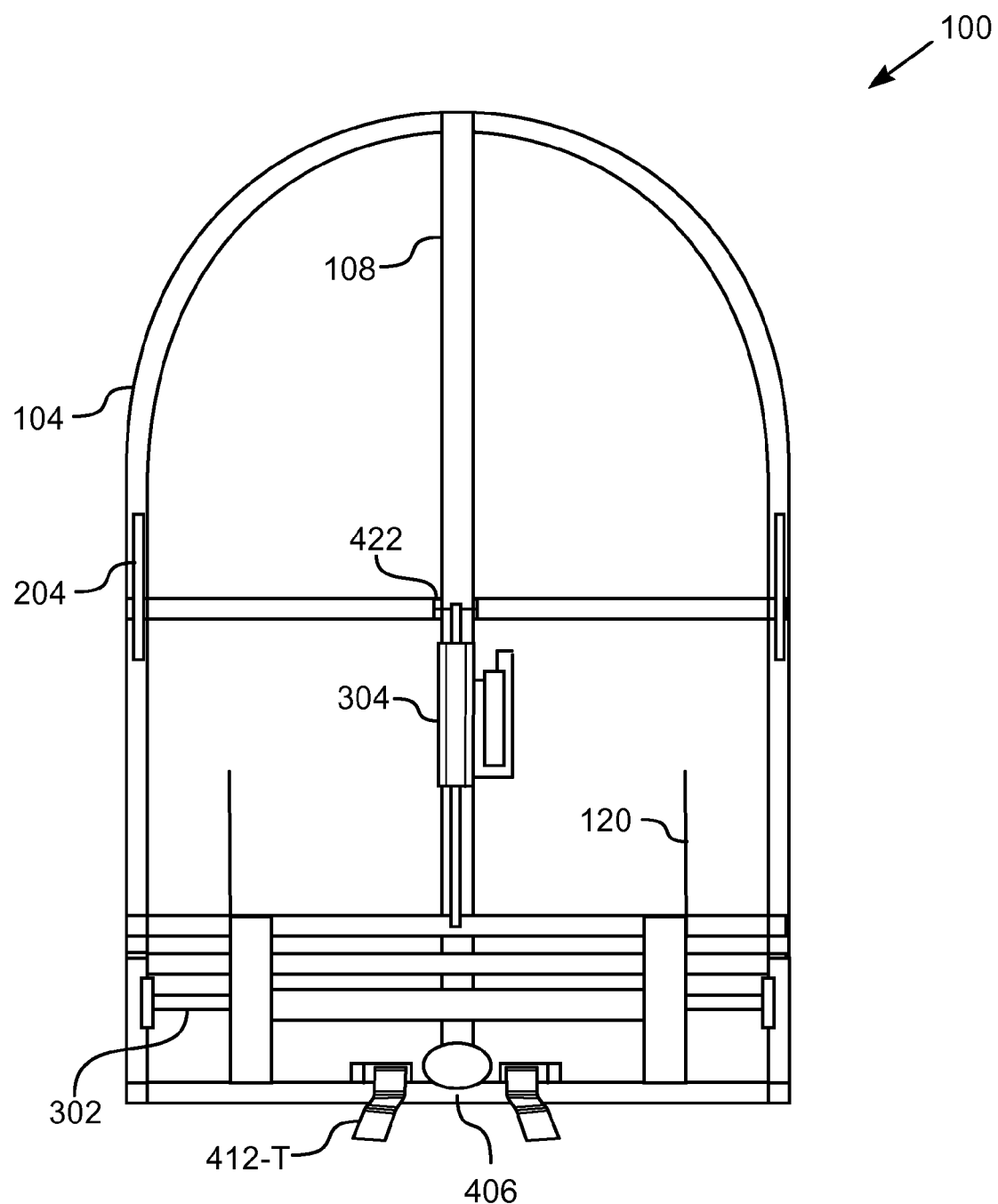
FIG. 6 is a plan view of back support of the safety frame shown in FIG. 3.

FIG. 3 illustrates a side view of one embodiment of a safety frame 100. FIG. 4 illustrates a top view of the safety frame 100 shown in FIG. 3. FIG. 5 illustrates a front view of the safety frame 100 shown in FIG. 3. FIG. 6 illustrates a plan view of the back support 104 of the safety frame 100 shown in FIG. 3.

The impact dispersal feature of the safety frame 100 includes the hydraulic system 304 mechanically attached between the vertical support 104 and the platform 106. The platform 106 is attached to the base 102 by an axle 302. The axle 302 is supported on the base 102 by a pair of supports 402. Relative to the base 102, the platform 106 pivots about the axle 302. In the illustrated embodiment, the axle 302 is positioned forward of the center of the platform 106. The platform 106 in illustrated embodiment includes a pair of opposed rails 436. The rails 436 are angles that have the upright walls on the outside of the platform 106. In this way the child seat 118 fits between the outside walls of the rails 436.

The rear 306 of the platform 106 has a crosspiece 428 that supports a bracket 420. The bracket 420 connects the distal end of the piston rod 424 to the platform 106 with a pivoting connection. The distal end of the piston cylinder 426 is connected to a bracket 422 attached to a cross-member 430 of the vertical support 104. The bracket 422 provides a pivoting connection between the cylinder 426 and the vertical support 104. In this way, when the platform 106 pivots due to a collision or other impact sustained by the vehicle, the rear 306 of the platform 106 pivots upward, thereby forcing the piston rod 424 into the cylinder 426, with the piston rod 424 into the cylinder 426 free to move in response to the pivoting platform 106.

The frame 110 has a tethering system configured to securely attach the frame 110 to the vehicle. A top tether 108 includes a connector 122 attached to the strap of the tether 108. The connector 122 is configured to attach to the rear or top LATCH anchor 124 of the vehicle. The connector 122 also has an adjustable feature where the tail end 108-T of the top tether 108 is pulled through the connector 122 to adjust the length of the top tether 108 and to snug up the frame 110 to the seatback 114. The top tether 108 is routed over the vertical support 104, through the bracket 422 for the cylinder 426, and behind and under the rear 306 of the platform 106. The top tether 108 terminates at a tightening assembly 410 mounted on a plate 408 at the front of the base 102.

The top tether tightening assembly 410 provides a mechanical advantage for tightening a snugged up top tether 108. That is, after the top tether 108 is snugged up by connecting the connector 122 to the top anchor 124, the top tether 108 is further tightened by the tightening assembly 410. In the illustrated embodiment, the tightening assembly 410 includes a threaded rod 404 attached to the strap of the top tether 108. A knob 406 engages the threaded rod 404 to pull the top tether 108, thereby providing a mechanical advantage to securely tighten the top tether 108. In another embodiment, a toggle, crank, or lever engages the rod 404 to provide the mechanical advantage for pulling the end of the top tether 108 toward the front of the base 102.

The tethering system of the frame 110 also includes a pair of lower tethers 412. The lower tethers 412 are straps that have a connector 416 at one distal end. The connector 416 is configured to mate with the lower anchors of a LATCH system installed in a vehicle. The opposite end 412-T of the lower tethers 412 pass through a cam latch 414. To secure the base 102 to the vehicle seat 112, the connectors 416 are attached to the lower LATCH anchors and then the tail end 412-T of the lower tethers 412 are pulled to tighten the lower tethers 412. In one embodiment, the cam latches 414 for the lower tethers 412 are fixed to the plate 408. The lower tethers 412 are secured by pulling on the end 412-T of the tethers 412. In another embodiment, the cam latches 414 are movable on the plate 408 with a mechanism that offers a mechanical advantage to tighten the tethers 412 after the tethers 412 are snugged up when the hooks 416 are secured to the lower anchors of the vehicle.

The illustrated embodiment shows the safety frame 110 with a vertical support 104 having a rounded or oval top portion. In one embodiment the top of the vertical support 104 and the front of the base 102 match the contours of the child safety seat 118-F. In this way no part of the frame 110 protrudes past the sides of the child safety seat 118-F. The rounded top of the vertical support 104 for the case with the rear facing child safety seat 118-R ensures that there are no corners or edges that would present a hazard either to the seat 116 or to a person manipulating the safety frame 110.

Although the illustrated embodiment shows the frame 110 as a structure of tubes, either rectangular or circular in cross-section, in another embodiment the base 102 and vertical support 104 are pans or flat structures that have the structural strength required for the base 102 and vertical support 104 and also present an enclosed surface separating the bottom and back, respectively, from the components inside the frame 110. In one such embodiment, the safety system 100 is incorporated as part of the child safety seat 118, that is, the system 100 is integral with the seat 118. In another embodiment, the platform 106 is a pan that presents an enclosed surface separating the components of the frame 110 from the rails that receive the child seat 118.

FIG. 7 illustrates a schematic diagram of one embodiment of a hydraulic system 304 for a safety frame system 100. The hydraulic system 304 is an impact dispersal system 304 that includes a hydraulic cylinder 426 and a dispersion valve 714. The hydraulic cylinder 426 includes a piston 702 with a seal 704, such as an o-ring. Extending from the piston 702 is a piston rod 424. Inside the cylinder 426 is hydraulic fluid 706.

Attached to the distal end of the cylinder 726 is an outlet 710 that is in fluid communication with the inlet 712 of the dispersion valve 714. The outlet 716 of the valve 714 is in fluid communication with a port at the piston rod end 718 of the cylinder 426. The hydraulic system 304 is a closed system with the fluid 706 moving from the chamber at the distal end of the cylinder 426, through the valve 714, and into the proximal end 718, which acts as a reservoir. When an impact 720 is received by the piston rod 424, the pressure of the fluid 706 in the cylinder 426 increases rapidly. When the pressure of the fluid 706 increases past the setpoint of the valve 714, the valve 714 actuates and the fluid 704 flows to the reservoir 718. In another embodiment the reservoir is a tank separate from the cylinder 426.

The valve 714, in one embodiment, is a relief valve with a single set point. When the pressure of the fluid 706 in the cylinder 426 exceeds the setpoint of the relief valve the valve actuates. The sizing of the relief valve determines the flow rate through the relief valve 714 and the rate of dispersion. In other embodiments, the valve 714 is a variable dispersion valve that controls the flow of fluid 704 through the valve 714 based on the pressure at the valve inlet 712. Applicant has described various embodiments of impact dispersal systems in his U.S. Pat. No. 7,472,935, titled "Impact dispersal device," U.S. Pat. No. 8,020,584, titled "Variable valve for impact dispersal device," and U.S. Pat. No. 8,424,658, titled "Pressure actuating valve for impact dispersal device," all of which are incorporated by reference.

FIG. 8 illustrates a cross-sectional view of one embodiment of a variable dispersion valve 714-A. The valve 714-A is illustrated in a partially actuated position with the ball 802 lifted from the seat 804, thereby connecting the inlet port 712 to the outlet port 716. The outlet port 716 has a bore 806 that is cylindrical with a bottom edge 808 that is substantially collinear with the top of the seat 1312 and that has a tapering bore 808 that merges into the outlet bore 806.

The illustrated valve 714-A has a two section body 810, 812. In another embodiment, the valve 714-A has a one-piece body. The lower section 810 has a wall thickness sufficient to withstand the operating pressure of the fluid 706. The upper section 812 has thinner walls and houses the spring 814, which is retained by the plug 816. The plug 816 is threaded and engages female threads in the body section 812. The two sections 810, 812 are secured together with a plurality of fasteners 818. The piston 820 has an o-ring 822 that isolates the fluid 706 in the lower section 810 near the seat 804 from the upper section 812 where the biasing spring 824 is located.

The piston 820 slides within a bore 824. Within the piston bore 824 between the piston 820 and the plug 816 is a stop pin 826, which is surrounded by the spring 814. In the illustrated embodiment, the stop pin 826 is attached to the piston 820, but in other embodiments the pin 826 is attached to the plug 816 or otherwise retained within the piston bore 824. The stop pin 826 prevents the piston 820 from being forced too far towards the plug 816 and limits the travel of the piston 820 within the piston bore 824. In one embodiment, the end of the spring 814 fits into a recess in the piston 820, thereby allowing the height of the valve 714-A to be reduced.

In operation, the valve 714-A has a setpoint determined by the spring 814. The compression of the spring 814, and the valve setpoint, is adjusted by the distance that the plug 816 is threaded into the body section 812. When the pressure of the fluid 706 in communication with the inlet port 712 exceeds the setpoint, the piston 820 lifts the ball 802 from the seat 804, thereby allowing the fluid 706 to flow to the outlet port 716. If the fluid pressure is sufficiently high, the piston 820 compresses the spring 814 further and also exposes more of the tapering bore 808 to the fluid 706 from the inlet port 712. As the piston 820 moves away from the seat 804, the flow rate through the valve 714-A increases. If the fluid pressure is too great, the piston 820 moves through the bore 824 until the piston 820 travel is stopped by the stop pin 826.

In various embodiments, the tapering bore 808 is a slot or an enlarged opening that allows fluid 706 to pass through the valve 714-A at a rate based on the cross-sectional area of the tapering bore 808 exposed by the piston 820. In the illustrated embodiment, the tapering bore 808 is slanted such that, as the piston 820 moves upward, a greater volume of fluid 706 flows into the tapering bore 808. Those skilled in the art will recognize that the angle and shape of the tapering bore 808 can vary without departing from the scope and spirit of the present invention. As the main outlet bore 806 is exposed by the piston 820 moving up, the rate of flow from the inlet port 712 to the outlet port 716 increases. In one embodiment, the tapering bore 808 is a channel in the valve body 810. In another embodiment, the tapering bore 808 is formed by a tapered end mill that cuts a groove in the surface of the bore 806. In the illustrated embodiment, the bottom of the tapering bore 808 is even with the seat of the inlet port 712. In other embodiments the tapering bore 808 is positioned to be exposed after the piston 812 becomes unseated.

In the illustrated embodiment, the valve 714-A has a first setpoint associated with initially exposing the tapering bore

808, a second setpoint associated with exposing the main outlet bore 806, and a high setpoint associated with having the maximum area of the main outlet bore 806 exposed. The outlet port 716 is a staged outlet port because of the tapering bore 808 and the main outlet bore 806 allow the flow rate through the outlet port 716 to vary by stages. That is, the first stage of the illustrated embodiment begins when the piston 820 exposes the tapering bore 808, thereby allowing fluid to flow through the valve in relation to the amount of the tapering bore 808 exposed by the piston 820 movement. The second stage begins when the piston 820 exposes the main bore 806, thereby allowing a greater flow rate through the valve 714-A.

In various embodiments, the shape, size, and location of the tapering bore 808 is configured to obtain the number of set points desired and the flow rate at and between each of those set points. The tapering bore 808 and main outlet bore 806 act as a variable flow restrictor, with the amount of flow restriction being a function of the exposed area and the position of the piston 820 based on the fluid pressure.

FIG. 9 illustrates a cross-sectional view of another embodiment of a variable dispersion valve 714-B. The valve 714-B is illustrated in a partially actuated position with the ball 802 lifted from the seat 804, thereby beginning to connect the inlet port 712 to the outlet port 716. The outlet port 716 has a bore 806 that is cylindrical except for the connection to the first bore 824, which includes a slot 808' that has a bottom edge that is substantially coplanar or in-line with the bottom of the bore 824 or with the top of the seat 804. The flow through the valve 714-B is determined by the distance the first piston 820' moves away from the seat 804. The flow increases as the piston 820' uncovers a greater portion of the slot 808' and the bore 806. In another embodiment, the outlet bore 806 is cylindrical.

Figure 13:
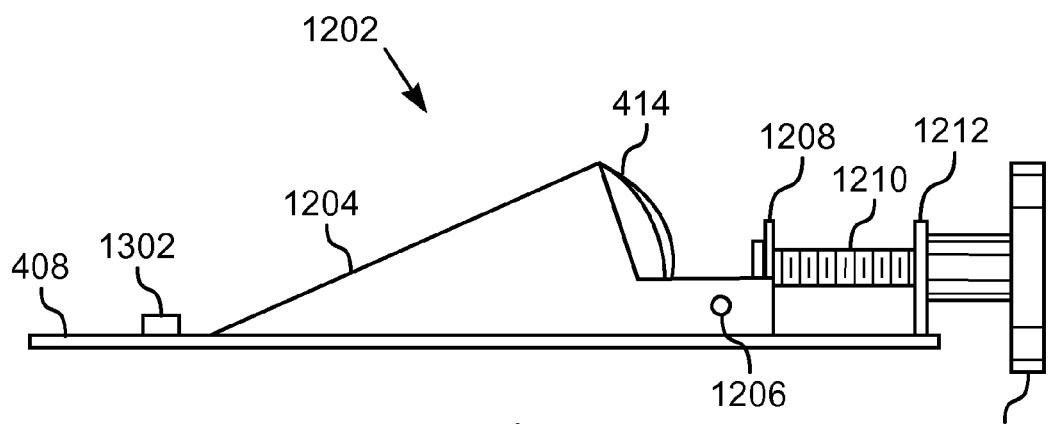
FIG. 13 is a side view of one embodiment of a lower tether tightening mechanism.

The illustrated variable dispersion valve 714-B has a one-piece body 902 with a cap 904. In another embodiment, the valve 1002-C has a two-piece body such as illustrated in FIG. 13. The body 902 has a first bore 824 that contains a first piston 820' and a spring 814. The distal end of the first piston 820' has a ball 802 that engages a seat 804. The other end of the first piston 820' engages the spring 814. The piston 820' has an o-ring 822-A that isolates the fluid 706 near the seat 802 from where the biasing spring 814 is located.

The first piston 820' slides within the bore 824. Within the piston bore 824 adjacent the spring 814 is a stop pin 826. In the illustrated embodiment, the stop pin 826 is attached to the first piston 820', but in other embodiments the pin 826 is attached to the return piston 908 or otherwise retained within the piston bore 824. The stop pin 826 prevents the first piston 820' from being forced too far away from the seat 804 and limits the travel of the first piston 820' within the piston bore 824. In one embodiment, the stop pin 826 has a length sufficient to engage the return piston 908 such that, with the return piston 908 at its extreme end of travel, the seat end of the first piston 820' blocks the inlet end 910-B of the first tube 910 but does not completely block the outlet bore 806, including the slot 808'. In such an embodiment, the first piston 820' has a stroke that extends to the upper portion of the outlet bore 806.

On the opposite side of the spring 814 from the first piston 820' is the return piston 908. An adjustment bolt 906 engages the cap 904 and contacts the return piston 908. The adjustment bolt 906 determines the compression of the spring 814, which determines the operating setpoint for the valve 714-B. The return piston 908 has a wide portion that slides within a cavity 914 and a narrow portion that slides within the bore 824. The return piston 908 is sealed in its cavity 914 with an o-ring 822-B. Between the return piston 908 and the cap 904 is the cavity 914 that is in fluid communication with the bore 824 adjacent the seat 804 and is also in fluid communication with the outlet port 716.

In the illustrated embodiment, a first tube 910 has one end 910-A connected to the cavity 914. The end 910-A has an orifice 916 where it connects with the cavity 914. The other end 910-B of the first tube 910 is connected to the bore 824 adjacent the seat 804. As the first piston 820' moves within the bore 824, the inlet port 712 is first in fluid communication with the slot, or ramp, 808' of the bore 806 for the outlet port 716 and then the inlet port 712 is in fluid communication with the first tube 910. The inlet end 910-B of the first tube 910 is offset from the seat 804 sufficiently to provide a delay in the pressurized fluid reaching the first tube 910 and pressuring the cavity 914 for the return piston 908. That is, the pressure at the inlet port 712 causes the first piston 820' to move, which causes fluid to first flow through the slot 808' and through the outlet port 716. If the pressure is sufficiently high, the first piston 820' will continue to move away from the seat 804 until the inlet end 910-B of the first tube 910 is uncovered by the first piston 820'. In one embodiment, the cavity 914 above the return piston 908 contains air at atmospheric pressure. The fluid 706 flowing from the first tube 910 into the cavity 914 must first compress the air before sufficient pressure is available to push the return piston 908 toward the first piston 820'. The compression of the air serves to increase the delay before the return piston 908 starts moving.

A second tube 912 has one end 912-A connected to the cavity 914. The end 912-A has an orifice 918 where it connects with the cavity 914. The other end of the second tube 912 is connected to the outlet port 716. As the first piston 820' moves within the bore 824, the inlet port 712 is in fluid communication with the outlet port 716, which puts the inlet port in fluid communication with the second tube 912.

Referring to FIG. 7, in operation the fluid 706 from the cylinder 426 is pressurized by the force 720 from an impact. The fluid 706 pressurizes the inlet port 712 of the valve 714-B. If the pressure is greater than the setpoint of the valve 714-B, the first piston 820' compresses the spring 814 and the ball 802 lifts from the seat 804. As soon as the first piston 820' moves the ball 802 off the seat 804, fluid 706 flows through the slot 808' out the outlet port 716. If the pressure at the inlet port 712 is sufficiently high, the first piston 820' moves to uncover the port 910-B for the first tube 910, which causes the cavity 914 to be pressurized. Because the area of the wide portion of the return piston 908 is greater than the area of the first piston 820', a greater force is generated at the return piston 908 than at the first piston 820', thereby causing the first piston 820' to force the ball 802 toward the seat 804. If the pressure is sufficiently high, the piston 820' will move until the stop pin 826 engages the return piston 908. In one embodiment, the stop pin 826 engages the return piston 908 before the return piston 908 moves to the end of its travel in the cavity 914. With the stop pin 826 engaging the return piston 908, as the return piston 908 is forced down by the pressure from the fluid that enters the inlet end 910-B of the first tube 910, the first piston 820' is forced toward the seat 804. The return piston 908 has a maximum travel such that the first piston 820' is forced toward the seat 804 and covers the inlet end 910-B of the first tube 910 while fluid continues to flow from the inlet port 712 through the slot 808' and the bore 806. At this position of the return piston 908, the force from the spring 814 is the only force pushing the first piston 820' toward the seat 804. Fluid 706 will continue to flow and the pressure will be relieved as long as the pressure is sufficient to overcome the spring force.

Because the second tube 912 connects the cavity 914 to the outlet port 716, which is typically at a lower pressure than the inlet port 712, the pressure in the cavity 914 is continually bled down. In one embodiment, the second tube 912 has a restricting orifice 918 located at the cap 904. The restricting orifice 918 limits the flow through the second tube 912. In another embodiment, the second tube 912 is sized to allow less flow than the first tube 910. Accordingly, when pressure is applied to the cavity 914 by the first tube 910, the second tube 912 does not have sufficient capacity to prevent the pressure in the cavity 914 from increasing. In particular, with an impact having a duration of approximately 10 to 60 milliseconds, the pressure bleeding from the second tube 912 will not appreciably affect the short term operation of the valve 714-B.

After the port for the first tube 910 is closed by the first piston 820', the second tube 912 continues to relieve the pressure in the cavity 914, which causes the return piston 908 to slowly move toward the adjustment bolt 906, which reduces the force applied to the spring 814 by the return piston 908. With less force on the spring 814, the first piston 820' requires less pressure at the inlet port 712 to keep the ball 802 from engaging the seat 804.

The illustrated embodiment of the variable dispersion valve 714-B opens at a setpoint pressure and as the pressure shoots past the setpoint value, the valve 714-B will partially close with pressure at the inlet port 712 greater than the setpoint pressure. That is, the valve 714-B opens to relieve the immediate pulse of pressure from an impact and then, after a short delay, begins to shut down as the input pressure is used as feedback to control the pressure relief through the valve 714-B. With the feedback, the valve 714-B opens quickly and shuts down quickly, serving to disperse more force from an impact with less travel of the piston rod 424 in the cylinder 426. In the illustrated embodiment, the first tube 910 has an inlet port 910-B that is offset from the valve seat 804, which results in a step function for the feedback. That is, until the first piston 820' moves sufficiently to expose the inlet port 910-B of the first tube 910 to the pressurized fluid 706 from the valve inlet port 712, the return piston 908 remains seated against the adjustment bolt 906.

The time before the return piston 908 begins to engage is determined by the size of the orifice 916 in the first tube 910 and the area of the return piston 908 in the cavity 914. The size of the orifice 918 in the second tube 912 determines the release rate for the pressure in the cavity 914.

In one embodiment, the dispersion valve 714-B is adjusted based on the combined weight of the child safety seat 118 and the child occupant. The adjustment bolt 906 interacts with the spring 814, allowing the impact dispersal system 304 to be dialed in for the size of the child safety seat 118 and occupant. For example, an infant in an infant sized child safety seat 118 has a lower setpoint for the valve 714-B to actuate than a toddler in a larger child safety seat 118.

FIG. 10 illustrates a pictorial view of another embodiment of the safety frame 100-A in a normal, deployed condition. The illustrated embodiment of the safety frame 100-A has the pivot point defined by the axle 302 moved forward relative to the embodiment illustrated in FIGS. 1-4. The more forward position of the axle 302 increases the stroke of the piston rod 424 into the cylinder 426 upon deployment of the safety frame 100-A. The normal configuration of the safety frame 100-A has the platform 106 in a position relative to the base 102 when the child safety seat 118 is properly positioned in the vehicle. The support frame 110 is secured to the vehicle seat 112 by the top tether 108 and either through the seat belt 202 or by the lower tethers 412.

FIG. 11 illustrates a pictorial view of the embodiment of the safety frame 100-A in an actuated condition after an impact. During actuation, the platform 106 pivots about the axle 302 from the force 1102 imposed by the child seat 118 from the impact. The center of gravity of the child safety seat 118 is above the platform 106 and behind the axle 302, thereby causing a rotational force 1102 on the platform 106. For a front impact, a force is applied by the seat 118 in the forward direction. This force translates into a rotational force 1102 that acts on the platform 106.

The rotational force 1102 causes the rear 306 of the platform 106 to want to rotate upwards and force the piston rod 424 into the cylinder 426. If the force 720 on the piston rod 424 is sufficient, the impact dispersal system 304 is actuated and the platform 106 rotates from the position shown in FIG. 10 to that shown in FIG. 11. Upon actuation, the rate of pivoting of the platform 106 is controlled by the impact dispersal system 304, which reduces the impact felt by the occupant of the child safety seat 118. In one embodiment, the piston 702 has a four inch stroke, of which two and one-half inches is used for a fully rated impact.

Figure 12:
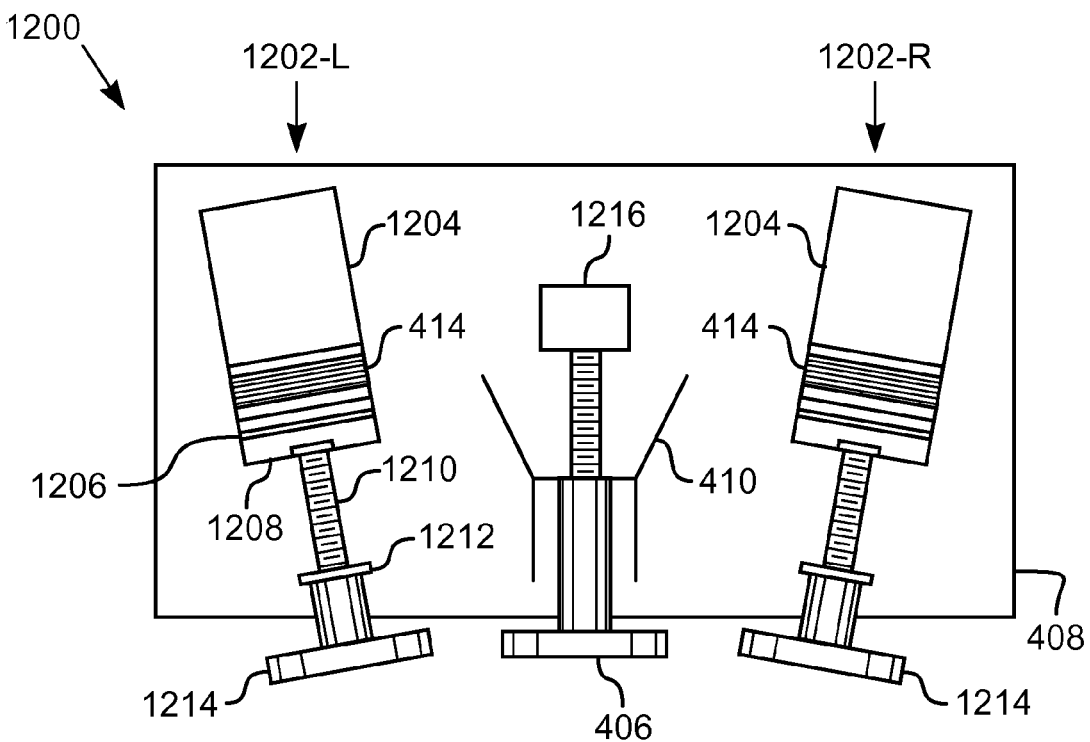
FIG. 12 is a top view of one embodiment of a tether tightening system.

FIG. 12 illustrates a top view of one embodiment of a tether tightening system 1200. FIG. 13 illustrates a side view of one embodiment of a lower tether tightening mechanism 1202. FIG. 4 illustrates a top tether tightening assembly 410 in which a mechanical advantage is used to tighten the top tether 108 and the lower tethers 412 are secured with locking devices 414 without a mechanical advantage. The tether tightening system 1200 uses mechanical advantage to tighten both the top tether 108 and the lower tethers 412. As used herein a mechanical advantage is defined as a force amplification such that an input force is amplified to produce a greater output force. Examples of mechanical advantage mechanisms include a lever, a gear train, and a threaded assembly. The illustrated embodiment of the tether tightening system 1200 uses threaded rods 404, 1210 to provide the mechanical advantage that allows a user to apply a force to a knob 406, 1214 in order to have a greater force applied to the tethers 108, 412.

The tether tightening system 1200 includes a top tether tightening assembly 410 and a pair of lower tether tightening mechanisms 1202-L, 1202-R. The top tether tightening assembly 410 includes a clamp 1216 that secures the top tether 108 to the top tether tightening assembly 410. The top tether knob 406 is an operator that is rotated to move the clamp 1216, and the top tether 108, forward to tighten the top tether 108 after it is connected to the top anchor 124 in the vehicle.

The tether tightening system 1200 also includes a pair of lower tether tightening mechanisms 1202-L, 1202-R. Each lower tether tightening mechanism 1202 includes a shuttle 1204, a locking mechanism 414, a roll pin 1206, and a mechanical advantage system 1208, 1210, 1212, 1214. A lower tether 412 is routed over the shuttle 1204, through the locking mechanism 414, and under and around the roll pin 1206. The roll pin 1206 allows the end of the lower tether 412-T to be grasped and pulled to snug up the tether 412 while maintaining engagement with the locking mechanism 414. In one such embodiment the locking mechanism 414 is a cam lock. In another embodiment the lower tether 412 engages a lock positioned in-line with the lower anchor in the vehicle and the adjustment knob 1214. In such an embodiment the end of the lower tether 412-T is pulled without the need for a roll pin 1206. In yet another embodiment the end 412-T of the lower tether 412 is routed through a slot or opening in the plate 408 where the end 412-T passes under the knob 1214.

The shuttle 1204 is movable relative to the mounting plate 408 along the longitudinal axis of the threaded rod 1210. The shuttle 1204 has a member 1208 that holds the end of the threaded rod 1210 captive while allowing the threaded rod 1210 to rotate. The member 1208 has a hole that holds the threaded rod 1210 captive. For example, the threaded rod 1210 is a bolt with the bolt head on the side of the member 1208 closest to the locking mechanism 414. In one such embodiment, the threaded rod 1210 has a keeper on the opposite side of the member 1208 so that the threaded rod 1210 is held in a fixed longitudinal position relative to the shuttle 1204 while the threaded rod 1210 is still free to rotate relative to the shuttle 1204.

The outboard end of the threaded rod 1210 engages a threaded portion of another member 1212 and a knob 1214 fixed to the threaded rod 1210. The member 1212 is attached to the plate 408 and provides a fixed point for the lower tether tightening mechanism 1202. Rotating the knob 1214 moves the shuttle 1204 relative to the member 1212, and the plate 408, to selectively tighten or loosen the lower tether 412 that is attached to the shuttle 1204. In this way after the lower tether 108 is snugged up by pulling the end of the lower tether 412-T, the lower tether 412 is further tightened by adjusting the knob 1214. In one embodiment, the knobs 406, 1214 are cranks that rotate the threaded rods 404, 1210.

In another embodiment, the knob 1214 has a threaded through-opening that engages the threads of the threaded rod 1210. The member 1212 is not threaded, but functions as a stop to hold the knob 1214 in a fixed longitudinal position, that is, as the knob 1214 is rotated, the threaded rod 1210 moves longitudinally and the knob 1214 maintains the same position relative to the member 1212. For example, the inboard end of the knob 1214 has a flange that engages a lip on the member 1212 that keeps the flange, and the knob 1214, from moving away from the member 1212. FIG. 13 illustrates a stop 1302 that prevents the shuttle 1204 from moving too far from the knob 1214, which could result in the threaded rod 1210 becoming disengaged.

In another embodiment the mechanical advantage is provided by a lever instead of a knob 406, 1214, and the lever provides leverage to tighten the tethers 108, 412. For example, the lever applies a tightening force to the tethers 108, 412 and a ratcheting mechanism holds the tethers 108, 412 in position until the user releases the tension in the tethers 108, 412.

The safety frame 100 includes various functions. The function of reducing the effects of a vehicle impact on an occupant of a child safety seat is implemented, in one embodiment, by the pivoting platform 106 and the impact dispersal system 304.

The function of securing the support frame 110 to the vehicle is implemented, in one embodiment, by the top tether 108 and the lower tethers 412. In another embodiment, the function of securing the support frame 110 to the vehicle is implemented by the top tether 108 and the vehicle seat belt 202.

The function of providing a mechanical advantage for the top tether 108 is implemented, in one embodiment, by the tightening assembly 410 mounted near the front of the base 102. The tightening assembly 410 provides a mechanical advantage to tighten the top tether 108 after the top tether 108 is snugged up to the top anchor 124 in the vehicle. In one such embodiment, the tightening assembly 410 includes a threaded rod 404 that cooperates with a knob 406 that is rotated to tighten the top tether 108 after the top tether 108 is snugged in place. In another embodiment, a toggle, crank, lever, or other device is used to provide the mechanical advantage to tighten the top tether 108.

The function of providing a mechanical advantage for the lower tethers is implemented, in one embodiment, by the lower tether tightening mechanism 1202 mounted near the front of the base 102. The lower tether tightening mechanism 1202 provides a mechanical advantage to tighten the lower tethers 412 after they are snugged up by pulling the end 412-T through the locking mechanism 414. In one such embodiment the lower tether tightening mechanism 1202 includes a shuttle 1204 that is connected to a threaded rod 1210 that, when rotated, moves the shuttle 1204, and the lower tether 412, relative to the plate 408 attached to the base 102, thereby tightening or loosening the tether 412. In one embodiment, the locking mechanism 414 is at an angle relative to the line of pull of the lower tether 412 and a roll pin 1206 is used to redirect the end 412-T of the lower tether 412 to permit manually pulling the tether 412 snug when attached to the lower LATCH anchors.

The function of routing the end 412-T of the lower tether 412, in one embodiment, includes the pivot or roll pin 1206 positioned at the outlet side of the locking mechanism 414, such as illustrated in FIGS. 12 and 13. In another embodiment the locking mechanism 414 is positioned such that the tether 412 is in-line with the lower anchor in the vehicle and the adjustment knob 1214. In yet another embodiment the end 412-T of the lower tether 412 is routed through a slot or opening in the plate 408 where the end 412-T passes under the knob 1214. In these embodiments the end 412-T of the lower tether 412 is routed to ensure proper operation of the locking mechanism 414 and to provide clearance for the knob 1214 to be operated by the user.

From the foregoing description, it will be recognized by those skilled in the art that an impact dispersal system 304 for a child safety seat 118 has been provided. The impact dispersal system 304 is mechanically connected to a support frame 100 and a platform 106 that is pivotably connected to a base 102 of the support frame 100. An impact causes a rotational force 1102 to be applied to the platform 106. The rotational force 1102 is transferred to the cylinder 426 and piston 424 of the impact dispersal system 304. A dispersion valve 714 relieves the pressure of the fluid 706 in the cylinder 426.

From the foregoing description, it will be recognized by those skilled in the art that a tether tightening system 1200 has been provided. The tether tightening system 1200 includes a top tether tightening assembly 410 and a pair of lower tether tightening mechanisms 1202-L, 1202-R. The tethers 108, 412 are initially tightened by pulling the straps 108, 412 taut. The mechanical advantage of the top tether tightening assembly 410 and the pair of lower tether tightening mechanisms 1202-L, 1202-R allow the tethers 108, 412 to be fully tightened regardless of the strength of the person installing the safety frame 100.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for attaching a child safety seat to a vehicle and reducing an effect of an impact on an occupant of the child safety seat, said apparatus comprising:
a support frame having a base and a back support;
a platform having a platform front and a platform rear, said platform rear proximate said back support, said platform attached to said base with a pivoting connection;
an impact dispersal system mechanically connected between said platform rear and said back support;
a pair of lower tethers routed between a front of said base and a rear of said base, each one of said pair of lower tethers having a lower attachment mechanism at a first end proximate said rear of said base, each said lower attachment mechanism configured to attach to a lower anchor in the vehicle, each one of said pair of lower tethers having a second end received by a locking mechanism; and
a top tether routed between said back support and said front of said base, a first end of said top tether having a top attachment mechanism configured to attach to a top anchor in the vehicle, and a second end of said top tether attached near said front of said base.

2. The apparatus of claim 1 wherein said impact dispersal system includes a cylinder with a piston rod and a dispersal valve connected to said cylinder, whereby said cylinder and said piston rod receive a force transferred through said platform from the impact.

3. The apparatus of claim 1 further including a tether tightening system including a pair of lower tether tightening mechanisms, each said lower tightening mechanism including a shuttle with said locking mechanism and a mechanical advantage mechanism with an operator whereby operation of said operator causes said shuttle to move to selectively tighten and loosen an associated one of said pair of lower tethers.

4. The apparatus of claim 3 wherein said mechanical advantage mechanism includes a threaded rod rotatable by said operator, said threaded rod engaging a threaded opening to move said shuttle along a longitudinal axis of said threaded rod.

5. The apparatus of claim 3 wherein said tether tightening system further includes a top tether tightening assembly, said top tether tightening assembly includes a threaded rod rotatable by a top tether operator, and said threaded rod engaging a threaded opening to selectively tighten and loosen said top tether.

6. The apparatus of claim 3 wherein said tether tightening system is attached to said base.

7. The apparatus of claim 1 wherein said support frame is integrated with the child safety seat.

8. The apparatus of claim 1 wherein said platform includes anchor points configured to receive straps from the child safety seat whereby the child safety seat is secured to said platform.

9. An apparatus for attaching a child safety seat to a vehicle and reducing an effect of an impact on an occupant of the child safety seat, said apparatus comprising:
a support frame having a base;
a tether tightening system attached to said base;
a pair of lower tethers routed between a front of said base and a rear of said base, each one of said pair of lower tethers having a lower attachment mechanism at a first end proximate said rear of said base, each said lower attachment mechanism configured to attach to a lower anchor in the vehicle, each one of said pair of lower tethers having a second end received by a locking mechanism in said tether tightening system; and
a top tether routed between said pair of lower tethers and between said front of said base and said rear of said base, a first end of said top tether having a top attachment mechanism configured to attach to a top anchor in the vehicle, and a second end of said top tether attached to a top tether tightening assembly in said tether tightening system.

10. The apparatus of claim 9 wherein said tether tightening system includes a pair of lower tether tightening mechanisms, each one of said lower tightening mechanisms including a shuttle with said locking mechanism and a mechanical advantage mechanism with an operator whereby operation of said operator causes said shuttle to move to selectively tighten and loosen an associated one of said pair of lower tethers.

11. The apparatus of claim 9 wherein said tether tightening system includes a pair of lower tether tightening mechanisms, each one of said lower tightening mechanisms including a shuttle with said locking mechanism and a mechanical advantage mechanism with an operator, and said mechanical advantage mechanism includes a threaded rod rotatable by said operator, and said threaded rod engaging a threaded opening to move said shuttle along a longitudinal axis of said threaded rod when said operator is rotated.

12. The apparatus of claim 11 wherein each one of said shuttles includes a means for routing said second end of an associated one of said pair of lower tethers to ensure proper operation of said locking mechanism and to provide clearance for said operator.

13. The apparatus of claim 9 wherein said tether tightening system further includes a top tether tightening assembly, said top tether tightening assembly includes a mechanical advantage mechanism having a threaded rod rotatable by a top tether operator, and said threaded rod engaging a threaded opening to selectively tighten and loosen said top tether when said top tether operator is rotated.

14. The apparatus of claim 9 further including a platform attached to said base with a pivoting connection and an impact dispersal system mechanically connected between said platform and said support frame, and said impact dispersal system includes a cylinder with a piston rod and a dispersal valve connected to said cylinder, whereby said cylinder and said piston rod receive a force transferred through said platform from the impact.

15. The apparatus of claim 9 wherein said support frame is integrated with the child safety seat.

16. An apparatus for attaching a child safety seat to a vehicle and reducing an effect of an impact on an occupant of the child safety seat, said apparatus comprising:
a support frame having a base and a vertical support;
a platform attached to said base with a pivoting connection; and
an impact dispersal system mechanically connected between a rear portion of said platform and said vertical support, said impact dispersal system including a cylinder with a piston rod and a dispersal valve in fluid communication with said cylinder, whereby said cylinder and said piston rod receive a force transferred through said platform from the impact.

17. The apparatus of claim 16 further including a pair of lower tethers routed between a front of said base and a rear of said base, each one of said pair of lower tethers having a lower attachment mechanism at a first end proximate said rear of said base, each one of said lower attachment mechanisms configured to attach to a lower anchor in the vehicle, each one of said pair of lower tethers having a second end received by a locking mechanism, and further including a top tether routed between said vertical support and said front of said base, a first end of said top tether having a top attachment mechanism configured to attach to a top anchor in the vehicle, a second end of said top tether attached near said front of said base.

18. The apparatus of claim 17 further including a tether tightening system including a pair of lower tether tightening mechanisms, each said lower tightening mechanism including a shuttle with said locking mechanism and a mechanical advantage mechanism with an operator whereby operation of said operator causes said shuttle to move to selectively tighten and loosen an associated one of said pair of lower tethers.

19. The apparatus of claim 17 further including a tether tightening system including a top tether tightening assembly, said top tether tightening assembly including a threaded rod rotatable by a top tether operator, and said threaded rod engaging a threaded opening to selectively tighten and loosen said top tether.

20. The apparatus of claim 16 wherein said support frame is integrated with the child safety seat.

* * * * *